No. 808,448.　　　　　　　　　　　　　　　　PATENTED DEC. 26, 1905.
H. GREENBERG.
WEIGHING SCALE.
APPLICATION FILED JULY 17, 1905.
3 SHEETS—SHEET 1.
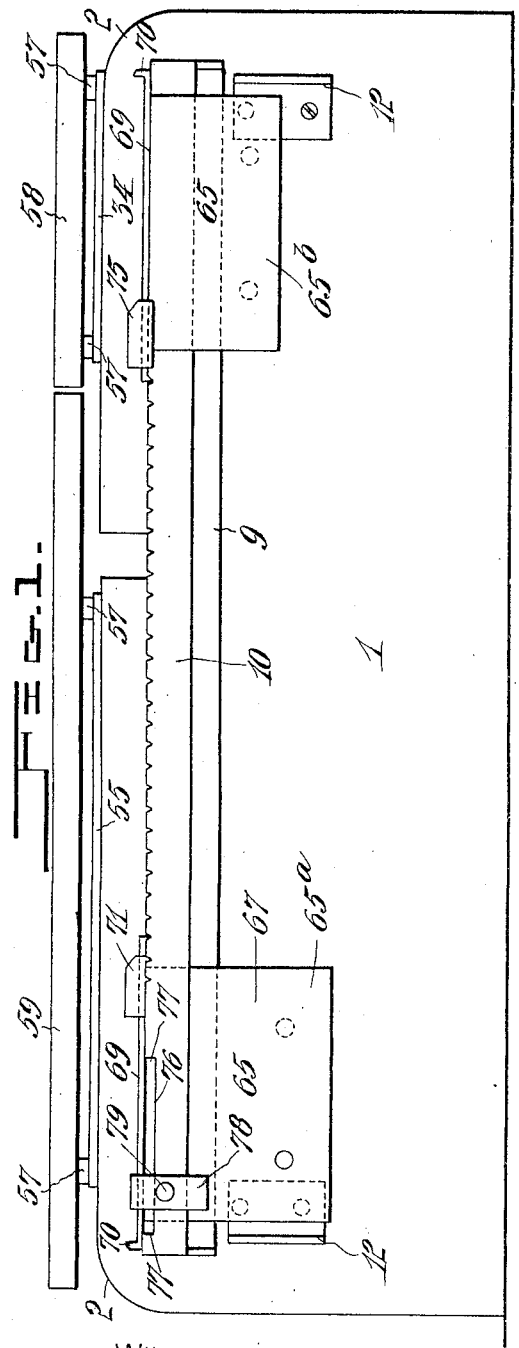
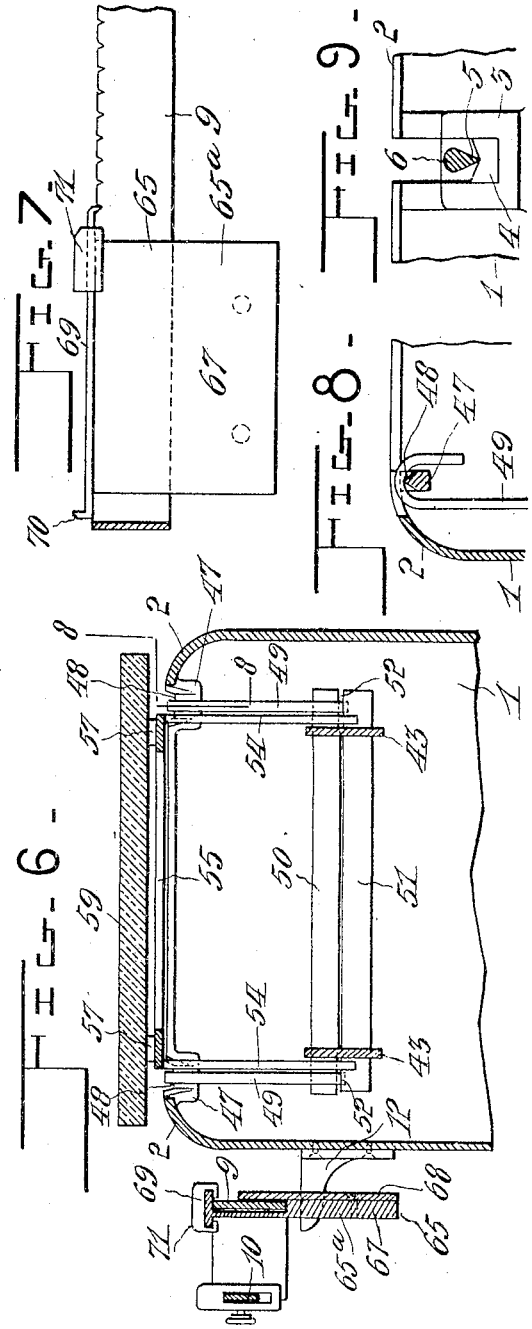
Witnesses:　　　　　　　　　　　　　　Herman Greenberg, Inventor,
　　　　　　　　　　　　　　　　　　　By Marion & Marion
　　　　　　　　　　　　　　　　　　　　　　　　　Attorneys

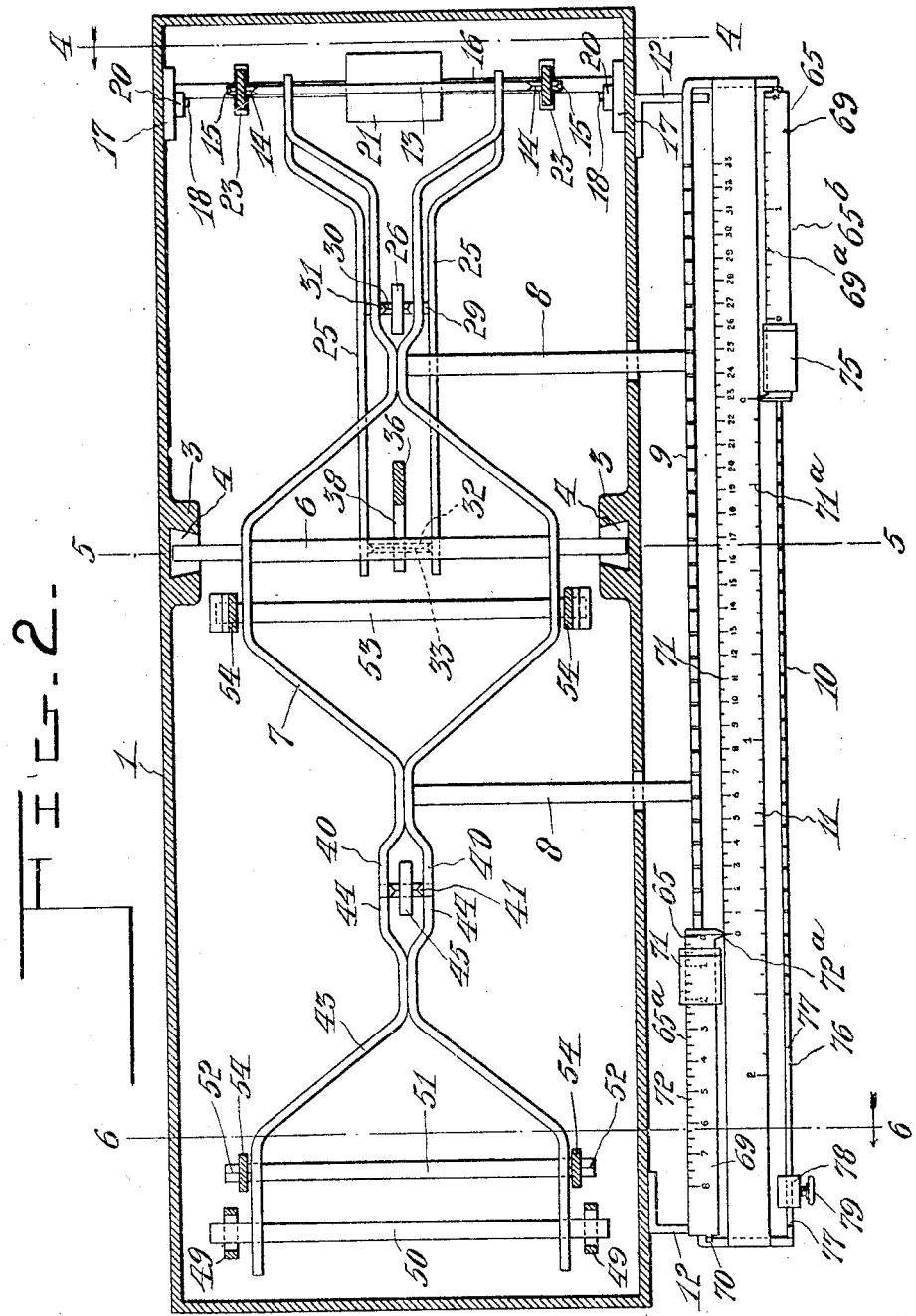

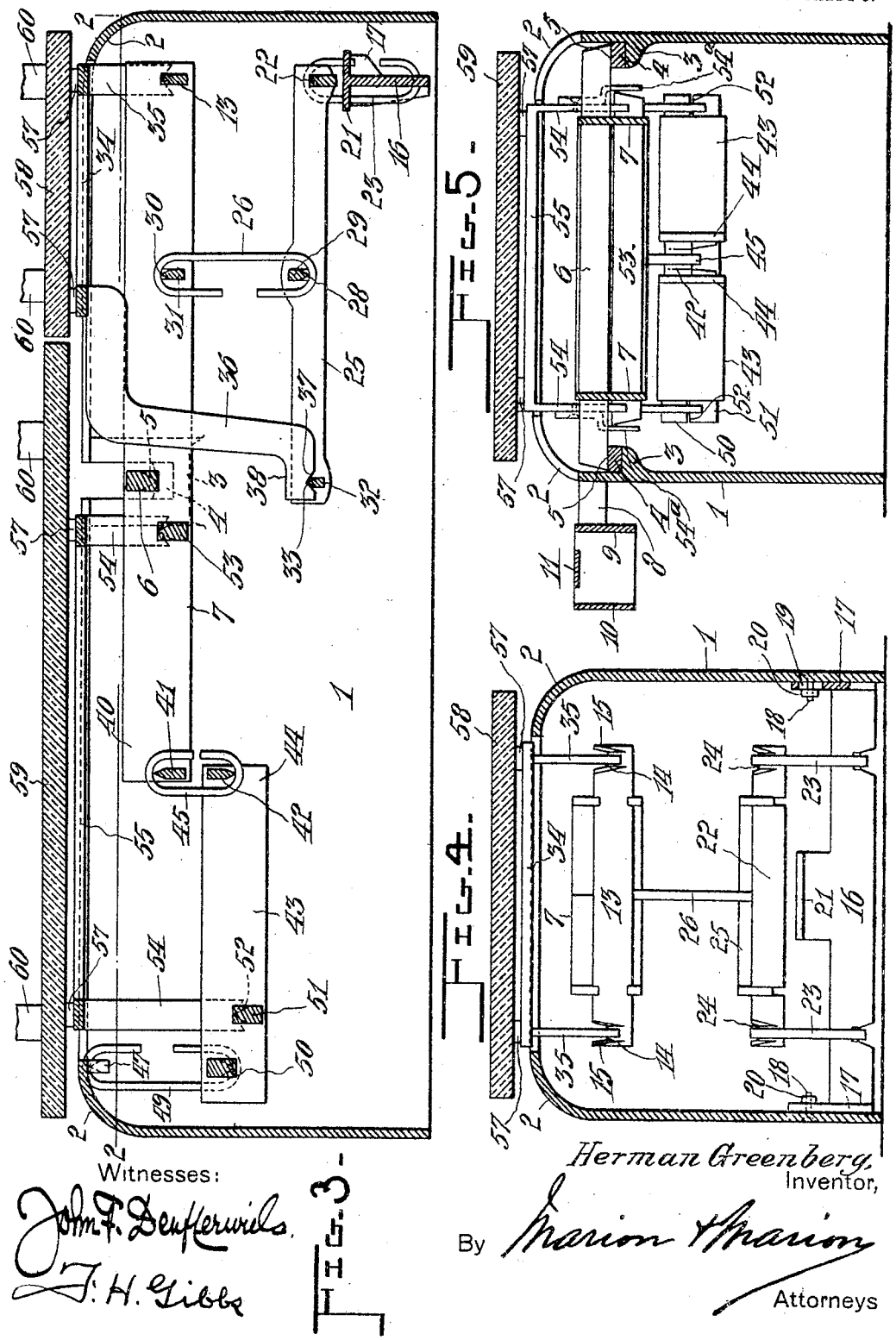

UNITED STATES PATENT OFFICE.

HERMAN GREENBERG, OF MONTREAL, CANADA.

WEIGHING-SCALE.

No. 808,448.　　　　　　Specification of Letters Patent.　　　　　　Patented Dec. 26, 1905.

Application filed July 17, 1905. Serial No. 269,929.

*To all whom it may concern:*

Be it known that I, HERMAN GREENBERG, a subject of the Czar of Russia, residing in the city and district of Montreal, in the Province of Quebec, Canada, have invented certain new and useful Improvements in Weighing-Scales; and I do hereby declare that the following is a full, clear, and exact description of the invention, such as will enable others skilled in the art to which it appertains to make and use the same.

This invention relates to new and useful improvements in weighing-scales, and comprises certain features of novelty in the detail construction and arrangement thereof, all as hereinafter more fully described, and specifically pointed out in the claims.

The object of the invention is to provide a multiple scale in a single integral structure having two or more platforms, either of which may be used separately, together with certain features of novelty in the construction of the scale, whereby while one platform is being used to weigh articles placed thereupon the other platform may be used while the first platform is occupied and the second platform perform its function as a complete scale, there being additional means provided whereby even when both platforms are occupied other articles may be weighed upon one or both of said platforms with accuracy without interfering at all with the arrangement of the poise or balance used to indicate the weight of articles upon said platforms in the first instance, it being within the spirit of the present invention to provide a plurality of platforms relatively in the same plane with one or all of said platforms carrying superposed platforms which may be utilized for weighing articles while the first platforms are occupied.

The invention consists in the combination and arrangement of parts, which are shown in the accompanying drawings, all as hereinafter more fully described, and particularly pointed out in the claims, it being understood that said drawings illustrate the preferred construction, which may be departed from in the form, proportion, and minor details of parts therein shown within the scope of the claims without sacrificing any of the advantages of the invention.

In the accompanying drawings, in which similar characters of reference indicate corresponding parts in all the views, Figure 1 is a side elevational view of a simple form of scale embodying the present invention. Fig. 2 is a horizontal sectional view taken relatively in the plane indicated by the line 2 2 in Fig. 3. Fig. 3 is a longitudinal vertical section. Fig. 4 is a transverse sectional view, taken on line 4 4 of Fig. 2, looking in the direction indicated by the arrow. Fig. 5 is a transverse sectional view on line 5 5 of Fig. 2. Fig. 6 is a similar view on line 6 6 of Fig. 2. Fig. 7 is a fragmentary view of the inner graduated bar, showing the poise or balance thereupon with the stop carried thereby for the fractional poise or balance above the same. Fig. 8 is a fragmentary detail showing one of the balance-supports, this view being taken approximately on line 8 8 of Fig. 6; and Fig. 9 is a fragmentary detail view showing the dovetailed wear-block for the main balance-bar.

Referring to the parts, 1 indicates the casing in which the balance-yokes hereinafter referred to are supported. This casing, as will be noted, is provided with inwardly-curved upper edge portions 2, which serve to prevent the entrance of foreign matter into the interior of said casing which might interfere with the proper operation of the scale.

Projecting into the casing 1 are recessed lugs 3, which lugs are provided with dovetailed channels therein, in which channels are seated dovetailed wear-blocks 4, upon which wear-blocks the knife-edge portions 5 of the main balance-bar 6 are supported. This balance-bar 6 extends transversely through what is hereinafter designated as the "main" balance-yoke 7, whereby a rockable support is provided for said yoke. Extending laterally from the yoke 7 are beam-supporting bars 8, which carry at their outer ends the graduated beams 9 and 10, there being a scale-plate 11, properly graduated, interposed between said beams 9 and 10.

Projecting laterally from the casing 1 are stop-brackets 12, which extend below the opposite ends of the graduated beam 9, so as to prevent excessive downward thrust of said beam in use.

At one end of the yoke 7—the right-hand end, as shown in Fig. 2—is supported a transversely-extending balance-bar 13, which bar is provided near opposite ends thereof with the knife-edge portions 14, stops 15 being provided at the outer ends of said bar 13.

Connected within the casing 1, relatively below the bar 13, is a fulcrum-bar 16, which is connected, by means of the side plates 17 and bolts 18, adjustably in position within said casing, there being elongated slots 19 provided in the members 17, so as to permit greater or less vertical play of the member 16 when the nuts 20 are released.

Relatively midway the length of the bar 16 is a table or platform 21, which serves as a stop for the bar 22, which is connected with the bar 16 by means of the coupling-links 23, which coupling-links rest upon the knife-edge portions 24 of said bar 22.

Connected rigidly with the bar 22 there is a supplemental balance-yoke 25, which supplemental yoke is connected, by means of the suspension-link 26, with the main balance-yoke 7, said link bearing against the knife-edge 28 of the connecting-bar 29 of the supplemental yoke 25 and being supported upon the knife-edge portion 30 of the connecting-bar 31, said bars 29 and 31 serving as couplings for the approximately parallel portions of said yokes. Carried by the inner end of the supplemental yoke 25 is a supporting-bar 32, which is provided with a knife-edge 33, as best shown in Fig. 3.

The platform-frame 34 is provided with downwardly-depending members 35, bifurcated at their lower ends, the bifurcated portions of which rest upon the knife-edge portions 15 of the bar 13, while the opposite end of said platform-frame 34 is provided with the inwardly and downwardly curved supporting-leg 36, which is provided with the seat or recess 37 in the relatively horizontal portion 38 thereof, which seat 37 rests upon the knife-edge portion of the supporting-bar 32, before referred to. At the inner end thereof the yoke 7 is bifurcated, and between the end portions 40 thereof there is held a supporting-bar 41, below which the supporting-bar 42 of the supplemental yoke 43 is held between the bifurcated ends 44 of said supplemental yoke, there being a link 45 bearing upon the knife-edge portions of said bars 41 and 42 to support the supplemental yoke 43 from the main balance-yoke, as best shown in Fig. 3.

Depending from the portion 2 of the casing 1 are supporting members 47, which may be formed integral with said casing 1, as best shown in Fig. 6, there being knife-edge portions 48 formed thereupon, upon which knife-edge portions are carried the supporting-links 49, which links extend downwardly and up, as shown in Fig. 3, and carry the bar 50, which is provided with a knife-edge portion at each end thereof resting upon said links. This bar 50, as will be noted in Fig. 2, extends transversely through and under the supplemental yoke 43, and by means of the links 49 a vibratory support is provided for said supplemental yoke. Nearer the center of the device than the bar 50 is a balance-bar 51, which is provided with knife-edge portions 52 at opposite ends thereof beyond the yoke 43.

Parallel with the main balance-bar 6 is another bar 53, likewise provided with knife-edge portions at the ends thereof beyond the main balance-yoke 7, and legs 54, provided with bifurcated lower ends, rest upon the knife-edge portions of said bars 51 and 53, as best shown in Fig. 3. The platform-frame 55 is connected with and supported by said legs 54, and it will be evident that the platform-frames 34 and 55 are each supported partly by the main balance-yoke 7 and one of said supplemental balance-yokes, the supplemental balance-yoke 25 assisting to support the platform-frame 34 and the supplemental balance-yoke 43 serving to support the platform-frame 55. It is to be understood that said platform-frames 34 and 55 may be approximately rectangular in shape or of any preferred form which may be desired, although the rectangular shape is preferred, and resting upon said platform-frames are cushions 57, preferably of rubber or other relatively soft material, upon which cushions are supported glass plates 58 and 59.

If desired, supplemental platforms may be superposed upon the plates 58 and 59, said supplemental platforms being supported upon the posts 60, which are shown broken away in Fig. 3, though said supplemental platforms would be mere duplications of the platforms 58 and 59. Hence further illustration thereof is not required except to say that said platforms may be multiplied, if desired, at one or both ends of the scale.

The balance-beam comprises a plurality of supporting-bars 9 and 10, upon each of which there is slidably mounted a poise or balance 65, the balance $65^a$ sliding upon the beam-section 9 and the balance $65^b$ sliding upon the beam 10.

By reference to Figs. 6 and 7 the construction of the balance $65^a$ will be observed, in which there is a plate 67, which is cut out, as shown in said Fig. 6, to permit the beam-bar 9 to rest between said plates 67 and the securing-plates 68, which are secured to the inner face of said plate 67, there being a cap-plate 69 secured to said plate 67, which cap-plate rides upon said member 9. The balance $65^a$ is slightly elongated, as best shown in Fig. 7, and the cap-plate 69 is bent upwardly at 70, whereby there is formed a stop for the fractional poise 71, which fractional poise is slidably mounted upon said plate 69 and is of considerably less weight than the poise 65. This balance $65^a$ is adapted to be used with the scale $71^a$, (shown upon the inner edge portion of the scale-plate 11,) there being a pointer or indicator $72^a$ projecting outwardly from the poise $65^a$ for well-understood purposes. The cap-plate 69 is graduated and provided with the scale 72, as best shown in Fig. 2.

The poise $65^b$ is substantially the same in construction as the poise $65^a$, except that the poise $65^a$, sliding on the inner beam 9, it is essential that the plate 68 be cut away in the poise $65^a$, so as to permit the poise $65^a$ passing the laterally-extending beam-supporting bar 8, and, as in the case of the poise 65$^a$, said poise 65$^b$ is provided with a cap-plate 69, which is graduated at 69$^a$ and has slidable thereupon the fractional poise 75.

The beam 10 is cut away, as shown at 76, and between the shoulders 77, at opposite ends of said cut-away portion, there is slidable upon said beam 10 an adjusting-balance 78, which is provided with a set-screw 79, which set-screw serves as a locking means to secure said adjusting-poise 78 in any desired position for the purpose of securing an arbitrary balance between the glass platforms 58 and 59 when it is desired to place some object upon either of said platforms for use on more than one occasion—as, for example, a scoop.

The operation of this scale is as follows: The balances 65$^a$ and 65$^b$ are preferably, for example, arranged so as to weigh, respectively, pounds and ounces, while the fractional poise 71 of the balance 65$^a$ is arranged so that when it slides upon the scale 72 it will indicate fractions of ounces, and the fractional poise 75 upon the poise 65$^b$ will indicate some smaller division of an ounce.

One of the features of special advantage in connection with the present arrangement of these scales with their poise and fractional poise is that both platforms 58 and 59 may be used substantially at the same time—as, for example, the scale being adjusted to pounds, ounces, and fractions thereof, a package weighing ten pounds may be placed upon the platform 59 with the poise 65$^a$ moved to indicate ten pounds to balance the scale, and another package may be placed upon the platform 58, weighing as much as the capacity of the outer scale 71$^a$, and poise 65$^b$ will indicate the weight, depending upon the weight of the poise 65$^b$, when the package on the platform 58 may be weighed after balance has been established by means of the poise 65$^a$ for the first package, and the weight of the second package may be ascertained to a nicety. Assuming that the second package may weigh exactly two ounces, the poise 65$^b$ will be carried to the numeral 2 on the scale 71$^a$, and if is desired to weigh another package of, say, two grains or two drams the fractional poise 75 of the poise 65$^b$ may be used for that purpose.

Carried by the depending legs 54, and projecting laterally at each side thereof, are guards 54$^a$, which prevent lateral play of the platform 55.

It will be noted that the main yoke and supplemental yoke are so proportioned that one pound on platform 58 will balance eight pounds on platform 59, and this ratio may be carried out indefinitely, whereas the usual scale is so proportioned that the platforms will balance if equal weights are placed upon them.

Having described my invention, what I claim, and desire to secure by Letters Patent, is—

1. In a weighing-scale, a main balance-yoke, a pair of supplemental balance-yokes, one of which supplemental yokes is connected to the outer end of and extends outwardly from the main yoke, and a pair of platforms, each of which is partly supported upon said main yoke, and upon said supplemental yoke.

2. In a weighing-scale, a main balance-yoke, a pair of supplemental balance-yokes, one of which supplemental yokes is connected to the outer end of and extends outwardly from the main yoke, and a pair of platforms each of which is partly supported upon said main yoke, and upon said supplemental yoke, and guides carried by one of said platforms to prevent lateral movement of said platforms.

3. In a weighing-scale, a main balance-yoke, a pair of supplemental balance-yokes supported from said main yoke in planes there below, one of which supplemental yokes is connected to the outer end of and extends outwardly from the main yoke, and a pair of platforms, each of which is partly supported upon said main yoke, and upon said supplemental yoke.

4. In a weighing-scale, a main balance-yoke, a pair of supplemental balance-yokes, one of which supplemental yokes is connected to the outer end of and extends outwardly from the main yoke, and a pair of platforms, each of which is partly supported upon said main yoke, and upon said supplemental yoke, in combination with a multiple balance-beam, the members of the beam being disposed in different vertical and the same horizontal planes, a scale-plate intermediate of said beam members and provided with graduations on its upper face, slidable balance-weights on said beam provided with graduations on the upper surface thereof, and a superposed fractional poise slidable on one of said balance-weights.

5. In a weighing-scale, a main balance-yoke, a supplemental balance-yoke rockably supported in proximity to each end of said main yoke, and one of said supplemental balance-yokes extending outwardly from the main balance-yoke, platforms each of which is supported by said main yoke and one of said supplemental balance-yokes, a balance-beam supported by said main yoke, and comprising a plurality of members disposed in different vertical and the same horizontal planes, a scale-plate intermediate of said members provided with graduations on its upper face, a plurality of balance-weights slidable on said beam and provided with graduations on their upper surfaces, and superposed slidable fractional poises movable on said weights.

6. In a scale, a casing, inwardly-projecting lugs integral therewith, bearing-blocks supported in said lugs, a main balance-yoke supported on said blocks, integral yoke-supporting lugs near one end of said casing, and a supplemental balance-yoke carried from said supporting-lugs and said main balance-yoke, and guards on said supplemental yoke to prevent lateral play thereof.

7. In a balance-scale, a casing, a fulcrum-bar extending across said casing, a stop-table integral with said fulcrum-bar, a main balance-yoke, a supplemental balance-yoke, a link rockably supporting said supplemental yoke, and a link connecting an end portion of the supplemental yoke with said fulcrum-bar, in combination with a platform supported partly by each of said yokes.

8. In a balance-scale, a casing, a fulcrum-bar extending across said casing, a stop-table integral with said fulcrum-bar, a main balance-yoke, a supplemental balance-yoke, a link rockably supporting said supplemental yoke, and a link connecting an end portion of the supplemental yoke with said fulcrum-bar, in combination with a platform supported partly by each of said yokes, laterally-extending arms, a beam carried by said arms, poises movable longitudinally of said beam, and supplemental or fractional poises movably mounted on said first-mentioned poises.

9. In a weighing-scale, a main balance-yoke, a plurality of supplemental balance-yokes, one of which is supported by said main balance-yoke, a platform-frame supported partly by said main yoke and partly by said supplemental yoke, a second platform-frame similarly supported, arms extending laterally from said main yoke, a multiple balance-beam carried by said arms, a plurality of poises slidable on said beam, and a plurality of fractional poises slidable on said first-mentioned poises.

10. In a weighing-scale, a balance-beam comprising a plurality of bars disposed in different vertical and the same horizontal planes, a graduated plate between said bars, poises slidable on said bars, said poises having graduations on the upper surfaces thereof, and other poises movably mounted upon the upper surfaces of said first-mentioned poises.

11. In weighing-scale, a main balance-yoke, supplemental balance-yokes supported therefrom near opposite ends thereof and one of said supplemental yokes extending outwardly from the main balance-yoke, platform-frames each supported partly by said main balance-yoke and partly by one of said supplemental yokes, a beam comprising a plurality of members disposed in the same horizontal and different vertical planes, a scale-plate disposed between the said members and provided with a graduation on its upper surface, poises slidable longitudinally upon opposite sides of said beam, graduations on the upper surfaces of said poises, and fractional poises movable on the upper surfaces of said first-mentioned poises.

12. In a weighing-scale, a main balance-yoke, supplemental balance-yokes supported therefrom near opposite ends thereof and one of said supplemental yokes extending outwardly from the main balance-yoke, platform-frames each supported partly by said main balance-yoke and partly by one of said supplemental yokes, a beam comprising a plurality of members disposed in the same horizontal and different vertical planes, a scale-plate disposed between the said members and provided with a graduation on its upper surface, poises slidable longitudinally upon opposite sides of said beam, graduations on the upper surfaces of said poises, fractional poises movable on the upper surfaces of said first-mentioned poises, and stops adapted to limit the movement of said fractional poises.

13. In a weighing-scale, a main balance-yoke, supplemental balance-yokes supported therefrom near opposite ends thereof, platform-frames each supported partly by said main balance-yoke and partly by one of said supplemental yokes, a beam, poises slidable longitudinally upon opposite sides of said beam, graduations on said poises, fractional poises movable on said first-mentioned poises, and a lockable adjusting-poise slidable on said beam.

14. In a scale, the combination comprising a casing, a main balance-yoke supported thereby, supplemental balance-yokes connected to the main balance-yoke, platforms partly supported by the main and the supplemental yokes, slotted plates secured to the casing, a fulcrum-bar secured to the plates, a bar secured to one of the supplemental yokes and links connecting the latter bar and the fulcrum-bar.

15. In a scale, the combination comprising a casing, a main balance-yoke supported therein, supplemental balance-yokes connected to the main balance-yoke, platforms partly supported by the main and supplemental yokes, slotted plates secured to the casing, a fulcrum-bar secured to the plates and provided with a stop-table, a bar secured to one of the supplemental yokes and links connecting the latter bar and the fulcrum-bar.

16. In a scale, the combination comprising a casing, a main balance-yoke supported therein, supplemental balance-yokes connected with the main balance-yoke, platforms partly supported by the main and supplemental yokes, cushions disposed on the platforms, plates disposed on the cushions, a multiple graduated beam carried by the main yoke, a scale-plate disposed intermediate of the members of the beam, poises disposed on the members of the beam and provided with graduations on the upper surfaces thereof, and fractional poises on the upper surfaces of said poises.

17. In a scale, the combination comprising a casing, a main balance-yoke supported therein, supplemental balance-yokes connected with the main balance-yoke, platforms partly supported by the main and supplemental yokes, cushions disposed on the platforms, plates disposed on the cushions, posts secured on the platforms and adapted to support supplemental plates, a multiple graduated beam carried by the main yoke, a scale-plate disposed intermediate of the members of the beam, poises disposed on the members of the beam and provided with graduations on the upper surfaces thereof, and fractional poises on the upper surfaces of said poises.

18. In a scale, the combination comprising a casing, a main balance-yoke, supplemental balance-yokes disposed in the casing and connected with the main balance-yoke, lateral arms secured to the main balance-yoke and extending through the casing, a multiple balance-beam carried by said arms and comprising a plurality of graduated members, a scale-plate disposed intermediate of said graduated members and provided with graduations on its upper surface, and a plurality of poises on said graduated members, each comprising a plate having a cut-away portion, a securing-plate, a cap-plate, and a fractional poise disposed on the cap-plate of each of said poises.

19. In a scale, the combination comprising a casing, a main balance-yoke, supplemental balance-yokes disposed in the casing and connected with the main balance-yoke, lateral arms secured to the main balance-yoke and extending through the casing, a multiple balance-beam carried by said arm and comprising a plurality of graduated members, a scale-plate disposed intermediate of said graduated members and provided with graduations on its upper surface, and a plurality of poises on said graduated members, each comprising a plate having a cut-away portion, a securing-plate, a cap-plate having an upturned end and graduations on its upper surface, and a fractional poise disposed on the cap-plate of each of said poises and adapted to abut against said upturned end of the cap-plate.

In witness whereof I have hereunto set my hand in the presence of two witnesses.

HERMAN GREENBERG.

Witnesses:
FRED. H. GIBBS,
JOHN F. DEUFFERWIEL.